(12) United States Patent
Hannula

(10) Patent No.: US 8,381,507 B2
(45) Date of Patent: Feb. 26, 2013

(54) SYSTEMS AND METHODS FOR OPTIMIZED GAS TURBINE SHUTDOWN

(75) Inventor: Scott Victor Hannula, Rexford, NY (US)

(73) Assignee: General Electric Company, Schenectady, NY (US)

( * ) Notice: Subject to any disclaimer, the term of this patent is extended or adjusted under 35 U.S.C. 154(b) by 52 days.

(21) Appl. No.: 13/103,164

(22) Filed: May 9, 2011

(65) Prior Publication Data

US 2012/0285174 A1  Nov. 15, 2012

(51) Int. Cl.
*F02C 9/00* (2006.01)

(52) U.S. Cl. .................. 60/39.281; 60/773

(58) Field of Classification Search ............ 60/39.281, 60/39.282, 773
See application file for complete search history.

(56) References Cited

U.S. PATENT DOCUMENTS

| | | | |
|---|---|---|---|
| 3,255,586 A * | 6/1966 | Hennig et al. ............ | 60/39.281 |
| 4,117,670 A * | 10/1978 | Dombkowsi et al. ...... | 60/39.281 |
| 4,151,712 A | 5/1979 | Martens et al. | |
| 6,253,537 B1 | 7/2001 | Suenaga et al. | |
| 2003/0094000 A1 | 5/2003 | Zagranski et al. | |
| 2006/0283191 A1 * | 12/2006 | Horswill et al. ............ | 60/773 |
| 2009/0249794 A1 | 10/2009 | Wilkes et al. | |
| 2009/0272118 A1 | 11/2009 | Alexander et al. | |
| 2010/0286889 A1 | 11/2010 | Childers | |

OTHER PUBLICATIONS

Unpublished U.S. Appl. No. 12/434,755, filed May 4, 2009, Jordan, Jr., et al.
Unpublished U.S. Appl. No. 12/826,733, filed Jun. 30, 2010, Snider, et al.

* cited by examiner

*Primary Examiner* — Phutthiwat Wongwian
(74) *Attorney, Agent, or Firm* — Sutherland Asbill & Brennan LLP

(57) ABSTRACT

A gas turbine engine. The gas turbine engine may include a compressor for compressing a flow of air, a combustor for combusting the flow of air and a flow of fuel to create a flow of combustion gases, a turbine driven by the flow of combustion gases, a rotor driven by the turbine and driving the compressor, a rotor speed sensor, and a gas turbine shut down controller. The gas turbine shut down controller varies the flow of fuel to the combustor based upon a rotational speed of the rotor as determined by a dynamic target trajectory schedule.

15 Claims, 1 Drawing Sheet

SYSTEMS AND METHODS FOR OPTIMIZED GAS TURBINE SHUTDOWN

TECHNICAL FIELD

The present application relates generally to gas turbine engines and more particularly relates to systems and methods for adjusting the trajectory of rotor speed verses time to achieve a desired deceleration rate. Such a desired deceleration rate ma be used to optimize emissions, temperature gradients, component clearances, and other types of gas turbine engine parameters.

BACKGROUND OF THE INVENTION

A common approach to gas turbine engine shutdown is to reduce the flow of fuel gradually over time. Once the flow of fuel and/or the rotor speed are sufficiently low for a particular turbine, the fuel flow may be stopped when the turbine decelerates to a minimum speed. This minimum speed may be known as the "turning gear speed", i.e., the speed at which the rotor must be continually turned by an outside source so as to prevent thermal bowing of the rotor. Depending upon the nature of the gas turbine engine, the fuel flow may be stopped at about twenty percent (20%) or so of typical full speed with the turning gear engaged at about one percent (1%) or so of full speed.

Reducing the flow of fuel flow over time, however, does not provide a direct relationship with the speed of the rotor. Rather, large variations in shutdown behavior may result. For example, variations in the speed of the rotor verses time may result. These variations in the speed of the rotor may produce significant differences in the fuel to air ratio because air intake is a function of the speed of the rotor while fuel flow is not directly related to speed. Varied shutdown times thus may lead to variations in firing temperatures, transient temperature gradients, variations in rotational speed, variations in emissions, and the like. Moreover, the variations in shutdown behavior may have an impact on turbine clearances and, hence, overall turbine performance and component lifetime.

There is therefore a desire for improved systems and methods for optimized gas turbine shutdown. Preferably, these improved systems and methods may control the rate of deceleration of the turbine rotor and related components over time so as to minimize shutdown variations and the impact thereof in a dynamic open loop fashion.

SUMMARY OF THE INVENTION

The present application and the resultant patent thus provide a gas turbine engine. The gas turbine engine may include a compressor for compressing a flow of air, a combustor for combusting the flow of air and a flow of fuel to create a flow of combustion gases, a turbine driven by the flow of combustion gases, a rotor driven by the turbine and driving the compressor, a rotor speed sensor, and a gas turbine shut down controller. The gas turbine shut down controller varies the flow of fuel to the combustor based upon a rotational speed of the rotor as determined by a dynamic target trajectory schedule.

The present application and the resultant patent further provide a method of shutting down a gas turbine engine. The method may include the steps of measuring a rotational speed of a rotor, measuring a rate of change of the rotational speed of the rotor, determining a target trajectory schedule of a remaining shut down time to a shut down rotational speed of the rotor, and adjusting a flow of fuel to meet the remaining shut down time at the shut down rotational speed.

The present application and the resultant patent further provide a gas turbine shut down controller for a gas turbine engine. The gas turbine engine shut down controller may include a target trajectory schedule of a remaining shut down time to a shut down rotational speed of the rotor, a trajectory adjustment schedule to produce an adjusted fuel flow request signal, a fuel flow schedule to produce a scheduled fuel flow signal, and one or more summing junctions to produce a fuel flow error signal based upon the scheduled fuel flow signal, the adjusted fuel flow request signal, and a rate of change of the rotational speed of the rotor.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
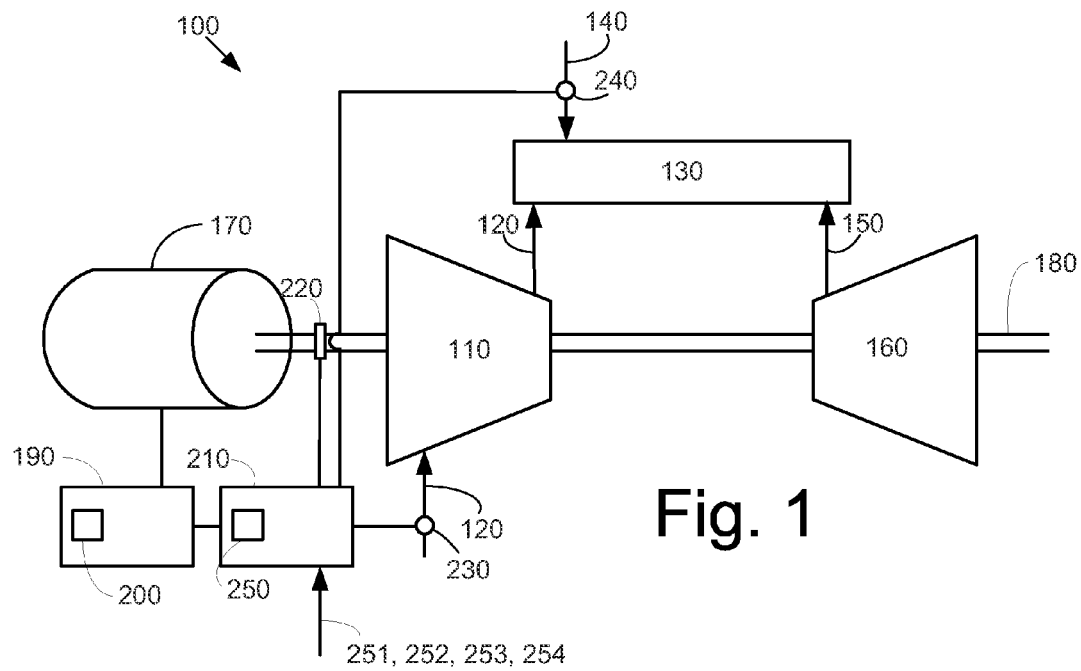
FIG. 1 is a schematic view of a gas turbine engine as may be described herein.

Referring now to the drawings, in which like numerals refer to like elements throughout the several views, FIG. 1 shows a schematic view of an example of a gas turbine engine 100 as may be described herein. Generally described, the gas turbine engine 100 may include a compressor 110. The compressor 110 compresses an incoming flow of air 120. The compressor 110 delivers the compressed flow of air 120 to a combustor 130. The combustor 130 mixes the compressed flow of air 120 with a compressed flow of fuel 140 and ignites the mixture to create a flow of combustion gases 150. Although only a single combustor 130 is shown, the gas turbine engine 100 may include any number of combustors 130. The flow of combustion gases 150 are in turn delivered to a turbine 160. The flow of combustion gases 150 drives the turbine 160 so as to produce mechanical work. The mechanical work produced in the turbine 160 drives the compressor 110 and an external load such as an electrical generator 170 and the like via a rotor 180. Other components and other configurations may be used herein.

The gas turbine engine 100 may use natural gas, various types of syngas, and other types of fuels. The gas turbine engine 100 may be any number of different types of gas turbines offered by, for example, General Electric Company of Schenectady, N.Y. The gas turbine engine 100 may have other configurations and may use other types of components. Other types of gas turbine engines also may be used herein. Multiple gas turbine engines 100, other types of turbines, and other types of power generation equipment may be used herein together.

A starting system 190 may be in communication with the generator 170. The starting system 190 may assist in the startup of the gas turbine engine 100 in a conventional manner. The starting system 190 may include a load commutating inverter 200 and the like. In simplified terms, the load commutating inverter 200 may reverse the operation of the generator 170 so as to transform the generator 170 into a motor configured for powered turning of the rotor 180. The starting system 190 thus may act in a regenerative mode to reverse the generator 170 so as to apply a negative torque to the rotor 180.

Overall operation of the gas turbine engine 100 may be controlled by a controller 210. Examples of suitable controllers 210 include, but are not limited to, application specific circuits, micro-controllers, micro-computers, personal computers, servers, and the like. The controller 210 may include any number of processors that facilitate the execution of computer readable instructions. By executing computer readable instructions associated with, for example, the trajectory of rotor speed verses time, the controller 210 may form a special purpose machine that controls the deceleration of the rotor 180. The controller 210 may include any number of associated devices, such as memory devices, input/output interfaces, network interfaces, operating systems, and the like. The controller 210 also may include any number of software applications that may be executed to facilitate the operations of the controller 210. Other components and other configurations may be used herein.

The controller 210 also may use various types of sensors. For example, a rotor speed sensor 220 may be positioned about the rotor 180 and may be in communication with the controller 210. The rotor speed sensor 220 may be a tachometer or a similar type of device. Likewise, the controller 210 may control the flow of air 120 via an airflow controller 230 and the flow of fuel 140 via a fuel flow controller 240. Other types of sensors in communication with the controller 210 or other controllers may be used herein.

The controller 210 also may include a modeler 250. The modeler 250 may include an on-board cycle model, simplified correlations ("OCMSC") system such as an advanced real-time engine simulator ("ARES"), a Model Based Controller ("MBC"), and the like to model hard to measure system parameters. Such system parameters may include hardware conditions such a metal temperatures, tip clearance requirements, emissions rates, and the like. As such, metal temperature sensors 251, clearance sensors 252, emission sensors 253, and other types of system sensors 254 may be used herein in communication with the controller 210. Other components and other configurations may be used herein.

Figure 2:
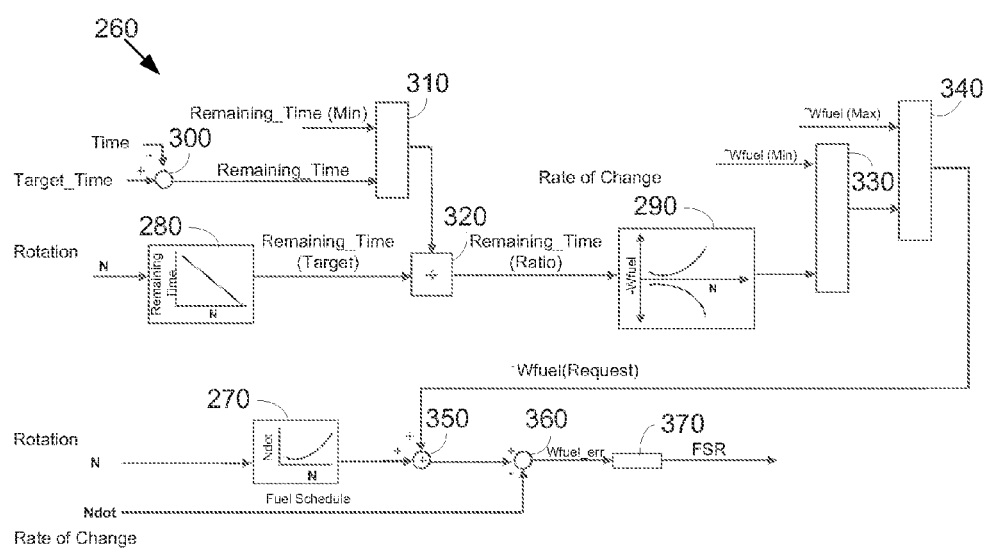
FIG. 2 is a schematic view of a gas turbine control system for adjusting the trajectory of rotor speed verses time.

FIG. 2 shows an optimized gas turbine shutdown controller 260 as may be described herein. The functionality of the optimized gas turbine shutdown controller 260 may be part of the functionality of the controller 210 as described above, a stand alone unit, or the functionality may be shared as desired. The optimized gas turbine shutdown controller 260 may include a fuel schedule 270. The fuel schedule 270 may concern the flow of fuel 140 based upon the rotational speed (N) of the rotor 180 as compared to the rate of change of the rotational speed (Ndot). The optimized gas turbine shutdown controller 260 also may include a dynamic target trajectory schedule 280. The dynamic target trajectory schedule 280 may compare the remaining time to the rotational speed (N) of the rotor 180 so as to reach a desired speed (N), such as the turning gear speed, at the desired time. The optimized gas turbine shutdown controller 260 also may include a trajectory adjustment schedule 290. The trajectory adjustment schedule 290 may provide an increase or a decrease in the flow of fuel 140 as will be described in more detail below. Other components and other configurations may be used herein.

Input into the optimized gas turbine shutdown controller 260 may include the current time (Time) in the target shutdown schedule 280, the target time (Target-Time) in the target shutdown schedule 280, the rotational speed (N) of the rotor 180, and the rate of change of the rotational speed (Ndot) of the rotor 180. Other parameters, such as those related to the modeler 250 also may be used herein. For example, the target time (Target_Time) may be based on engine parameters that may include those described above as determined by the metal temperature sensors 251, the clearance sensors 252, the emission sensors 253, and other types of system sensors 254 in communication with the modeler 250 and the like. Certain system parameters may prefer a longer or a shorter shut down time, a constant or a varied rate of change, and the like.

The current time (Time) may be compared to the target time (Target_Time) in a time summing junction 300 so as to result in a remaining time calculation (Remaining_Time). The remaining time (Remaining_Time) then may be compared to a minimum remaining time (Remaining_Time (Min)) in a time table 310. The maximum value of the remaining time (Remaining_Time) and the minimum remaining time (Remaining_Time (Min)) may be selected in the time table 310.

The rotational speed (N) of the rotor 180 may be determined by the rotor speed sensor 220. The rotational speed (N) of the rotor 180 then may be dynamically compared to the remaining time (Remaining_Time) in the target trajectory schedule 280. A target remaining time (Remaining_Time (Target)) thus may be determined therein. The larger of the minimum remaining time (Remaining_Time (Min)) and the remaining time (Remaining_Time) may be divided by the target remaining time (Remaining_Time (Target)) in a divider 320 so as to determine a remaining time ratio (Remaining_Time (Ratio)).

The remaining time ratio (Remaining_Time (Ratio)) thus may be compared to the rotational speed (N) of the rotor 180 in the trajectory adjustment schedule 290. The trajectory adjustment schedule 290 may produce an adjusted fuel flow signal (Wfuel). The signal representing the adjusted fuel flow (Wfuel) may be applied to a first serial auctioning circuit 330 and a second serial auctioning circuit 340. The serial auctioning circuits 330, 340 specify an allowable fuel flow range from a minimum fuel flow (Wfuel(Min)) to a maximum fuel flow (Wfuel(Max)) based upon a number of different operating parameters. The output of the serial auctioning circuits 330, 340 may be a fuel flow request signal (Wfuel(Request)).

The rotational speed (N) of the rotor 180 also may be compared to the rate of change of the rotational speed (Ndot) in the fuel schedule 270. A scheduled fuel flow (Wfuel) then may be compared to the fuel flow request (Wfuel(Request)) in a fuel summing junction 380 and a rate of change summing junction 360. The result may be a fuel flow error signal (Wfuel_err). The fuel flow error signal (Wfuel_err) may be used in a PI controller 370 to determine a fuel stroke reference (FSR). The PI controller 370 may be part of the functionality of the controller 260 or a stand alone unit. The fuel stroke reference (FSR) may be used by the fuel flow controller 240 with respect to the flow rate of the flow of fuel 140 to the combustor 130. The open loop processes described herein may be repeated until the turn gear speed or other specified speed or other condition may be reached. Other components and other configurations may be used herein.

The optimized gas turbine shutdown controller 260 thus provides open loop control so as to adjust the trajectory of rotor speed verses time during shutdown so as to reduce variations therein. The controller 260 may adjust the flow of fuel 140 in a dynamic manner to reach the target rotor speed at the targeted time. The target time may be dependent on ambient conditions to control any number of system parameters including part clearance, temperature gradients, emission output, and the like. The optimized gas turbine shutdown controller 260 may control the components described herein until turning gear speed is achieved. The optimized gas turbine shutdown controller 260 thus avoids the variations in shutdown times often resultant with known fixed fuel flow schedules and the associated variations in rotational speed, component temperatures, emissions, and the like. Moreover, operation of the optimized gas turbine shutdown controller 260 may be varied depending upon the desired parameter to be optimized.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. A gas turbine engine, comprising:
   a compressor for compressing a flow of air;
   a combustor for combusting the flow of air and a flow of fuel to create a flow of combustion gases;
   a turbine driven by the flow of combustion gases;
   a rotor driven by the turbine and driving the compressor;
   a rotor speed sensor determines a rotational speed of the rotor; and
   a gas turbine shut down controller with a dynamic target trajectory schedule that determines a target remaining time of shutting down the rotor according to the rotational speed of the rotor to vary the flow of fuel to the combustor.

2. The gas turbine engine of claim 1, wherein the combustor comprises a fuel flow controller in communication with the gas turbine shut down controller.

3. The gas turbine engine of claim 1, wherein the gas turbine shut down controller comprises a modeler.

4. The gas turbine engine of claim 1, wherein the gas turbine shut down controller comprises a fuel schedule to determine a scheduled fuel flow based upon the rotational speed of the rotor compared to a rate of change of the rotational speed.

5. The gas turbine engine of claim 1, wherein the gas turbine engine shut down controller comprises a trajectory adjustment schedule to produce an adjusted fuel flow based the rotational speed of the rotor and a remaining time ratio which is the larger of a minimum remaining time and a remaining time over the target remaining time.

6. The gas turbine engine of claim 5, wherein gas turbine engine shut down controller comprises a pair of serial auctioning circuits in communication with the trajectory adjustment schedule.

7. The gas turbine engine of claim 6, wherein the pair of serial auctioning circuits produces a requested fuel flow adjustment signal.

8. The gas turbine engine of claim 7, wherein the gas turbine shut down controller comprises a fuel summing junction and a rate of change summing junction so as to produce a fuel flow error signal based upon the requested fuel flow adjustment signal.

9. The gas turbine engine of claim 8, wherein the gas turbine shut down circuit comprises a PI controller such that the PI controller receives the fuel flow error signal and generates a fuel stroke reference.

10. The gas turbine engine of claim 1, further comprising a metal temperature sensor, a clearance sensor, and an emission sensor in communication with the gas turbine shut down controller.

11. A gas turbine shut down controller for a gas turbine engine, comprising:
    a target trajectory schedule determines a remaining shut down time to reach a shut down rotational speed of a rotor;
    a trajectory adjustment schedule to produce an adjusted fuel flow request signal;
    a fuel flow schedule to produce a scheduled fuel flow signal;
    one or more summing junctions to produce a fuel flow error signal based upon the scheduled fuel flow signal, the adjusted fuel flow request signal, and
    a rate of change of the rotational speed of the rotor to automatically control a fuel flow rate supply to a combustor.

12. The gas turbine shut down controller of claim 11, further comprising a PI controller to determine a fuel stroke reference based upon the received fuel flow error signal.

13. The gas turbine shut down controller of claim 12, further comprising a fuel flow controller in communication with the PI controller.

14. The gas turbine shut down controller of claim 11, further comprising an advanced real-time engine simulator modeler.

15. The gas turbine shut down controller of claim 14, further comprising a metal temperature sensor, a clearance sensor, and an emission sensor in communication with the advanced real-time engine simulator modeler.

* * * * *